(12) United States Patent
Cheng et al.

(10) Patent No.: US 10,545,389 B2
(45) Date of Patent: Jan. 28, 2020

(54) ELECTROPHORETIC DISPLAY PANEL

(71) Applicant: E Ink Holdings Inc., Hsinchu (TW)

(72) Inventors: Hsiao-Lung Cheng, Hsinchu (TW);
Pin-Cheng Chiu, Hsinchu (TW);
Ya-Mei Wang, Hsinchu (TW);
Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/831,394

(22) Filed: Dec. 5, 2017

(65) Prior Publication Data

US 2018/0157143 A1 Jun. 7, 2018

(30) Foreign Application Priority Data

Dec. 5, 2016 (CN) .......................... 2016 1 1102158

(51) Int. Cl.
| | | |
|---|---|---|
| *G02B 26/00* | (2006.01) | |
| *G02F 1/167* | (2019.01) | |
| *G09G 3/34* | (2006.01) | |
| *G09F 9/37* | (2006.01) | |

(52) U.S. Cl.
CPC ............. *G02F 1/167* (2013.01); *G09G 3/344* (2013.01); *G09F 9/37* (2013.01)

(58) Field of Classification Search
CPC ........... G02F 1/133305; G02F 1/13338; G02F 1/133514; G02F 1/167; G02F 2001/1676
USPC ................ 359/237, 242, 265–267, 270–273, 359/290–292, 295, 296, 298
See application file for complete search history.

(56) References Cited

U.S. PATENT DOCUMENTS

| | | | | |
|---|---|---|---|---|
| 8,120,588 B2 | | 2/2012 | Klinghult | |
| 2004/0196525 A1* | | 10/2004 | Fujii | ..................... G02B 26/005 359/245 |
| 2005/0195470 A1* | | 9/2005 | Takeda | .................. G02F 1/1333 359/296 |
| 2009/0231321 A1* | | 9/2009 | Matsuki | ............... G09G 3/3611 345/212 |

(Continued)

FOREIGN PATENT DOCUMENTS

| | | |
|---|---|---|
| TW | I421610 | 1/2014 |
| TW | I463236 | 12/2014 |

(Continued)

OTHER PUBLICATIONS

"Office Action of Taiwan Counterpart Application," dated Jul. 20, 2017, p. 1-p. 4.

*Primary Examiner* — Brandi N Thomas
(74) *Attorney, Agent, or Firm* — JCIPRNET

(57) ABSTRACT

An electrophoretic display panel including a first electrode layer, a second electrode layer, an electrophoretic display layer and a low surface energy coating layer is provided. The first electrode layer has a first surface and a second surface corresponding to the first surface. The electrophoretic display layer is disposed between the first electrode layer and the second electrode layer. The electrophoretic display layer has a third surface. The third surface of the electrophoretic display layer and the second surface of the first electrode layer have a gap therebetween. A gap distance of the gap is changed with a press operation. The low surface energy coating layer is coated on at least one of the second surface of the first electrode layer and the third surface of the electrophoretic display layer.

11 Claims, 3 Drawing Sheets

(56) References Cited

U.S. PATENT DOCUMENTS

| | | |
|---|---|---|
| 2010/0013787 A1 | 1/2010 | Takahashi et al. |
| 2011/0128257 A1 | 6/2011 | Kim |
| 2013/0082942 A1 | 4/2013 | Yu |
| 2015/0185948 A1* | 7/2015 | Chang .................. G06F 3/0416 345/174 |

FOREIGN PATENT DOCUMENTS

| | | |
|---|---|---|
| TW | 201502516 | 1/2015 |
| TW | I524930 | 3/2016 |
| WO | 0003349 | 1/2000 |

\* cited by examiner

ELECTROPHORETIC DISPLAY PANEL

CROSS-REFERENCE TO RELATED APPLICATION

This application claims the priority benefit of China application serial no. 201611102158.5, filed on Dec. 5, 2016. The entirety of the above-mentioned patent application is hereby incorporated by reference herein and made a part of this specification.

BACKGROUND OF THE INVENTION

Field of the Invention

The invention relates to a display panel and particularly relates to an electrophoretic display panel with a rewritable function.

Description of Related Art

With the improvements in electronic technology, electrophoretic display panels have more extensive applications. In order to use the electrophoretic display panel in a way similar to the use of an electronic writing board, so as to achieve a rewritable function, in the current design of the electrophoretic display panel with a writing function, the electrophoretic display panel is usually combined with a thin-film transistor (TFT) array and a touch panel equipped with a sensor. Such design leads to the traditional electrophoretic display panel with the rewritable function requiring complicated structural arrangement, circuit design and higher production costs. Consequently, how to contrive the structure of a rewritable electrophoretic display panel produced at lower costs and providing excellent rewritable quality is currently the significant issue.

SUMMARY OF THE INVENTION

An electrophoretic display panel is provided. The electrophoretic display panel may be operated in a writing state and a refresh state and provides excellent rewritable quality.

The electrophoretic display panel according to the embodiments of the invention includes a first electrode layer, a second electrode layer, an electrophoretic display layer and a low surface energy coating layer. The first electrode layer has a first surface and a second surface corresponding to the first surface. The electrophoretic display layer is disposed between the first electrode layer and the second electrode layer. The electrophoretic display layer has a third surface. A gap is provided between the third surface of the electrophoretic display layer and the second surface of the first electrode layer. A gap distance of the gap is changed with a press operation. A low surface energy coating layer is coated on at least one of the second surface of the first electrode layer and the third surface of the electrophoretic display layer.

In an embodiment of the invention, the second surface has a first low surface energy coating layer, and the third surface has a second low surface energy coating layer.

In an embodiment of the invention, the electrophoretic display panel further includes a plurality of spacers. The plurality of spacers are disposed between the second surface and the third surface. The plurality of spacers are configured to separate the first electrode layer from the electrophoretic display layer to form the gap.

In an embodiment of the invention, the press operation is that force is applied to the first surface of the first electrode layer to enable the gap distance corresponding to a press region to be changed with the press operation.

In an embodiment of the invention, the first electrode layer and the second electrode layer respectively receive two different voltage signals to provide an electric field between the first electrode layer and the second electrode layer. The electric field passing through the electrophoretic display layer is changed with the gap distance. Accordingly, a distribution state of colored particles in the electrophoretic display layer depends on the press operation.

In an embodiment of the invention, the electric field passing through the electrophoretic display layer in the press region increases with the decrease in the gap distance.

In an embodiment of the invention, the first electrode layer and the second electrode layer are coupled to a driving circuit. The driving circuit is configured to provide a first driving signal to the first electrode layer and provide a second driving signal to the second electrode layer to generate an electric field between the first electrode layer and the second electrode layer.

In an embodiment of the invention, when the first driving signal is a ground voltage and the second driving signal is a fixed voltage, the electrophoretic display layer is operated in a writing state.

In an embodiment of the invention, when the first driving signal is a first pulse voltage, the second driving signal is a second pulse voltage, and a phase of the first pulse voltage is opposite a phase of the second pulse voltage, the electrophoretic display layer is operated in a refresh state.

In an embodiment of the invention, a peak voltage of the first pulse voltage or the second pulse voltage is larger than the fixed voltage.

In an embodiment of the invention, the driving circuit includes a microcontroller, a first digital-to-analog converter and a second digital-to-analog converter. The microcontroller is configured to output a first control signal and a second control signal. The first digital-to-analog converter and the second digital-to-analog converter are coupled to the microcontroller. The first digital-to-analog converter and the second digital-to-analog converter produces the first driving signal and the second driving signal based on the first control signal and the second control signal respectively.

In an embodiment of the invention, the driving circuit further includes a voltage generator. The voltage generator is coupled to the first digital-to-analog converter and the second digital-to-analog converter. The voltage generator is configured to provide a voltage level for the first digital-to-analog converter and the second digital-to-analog converter.

In view of the foregoing, in the exemplary embodiments of the invention, the first electrode layer of the electrophoretic display panel and the electrophoretic display layer of the electrophoretic display panel may be spaced at a gap through the spacer. When the electrophoretic display panel is operated in the writing state, the gap between the first electrode layer and the electrophoretic display layer provides press pace for the first electrode layer in the press region moving to the electrophoretic display layer. Moreover, at least one surface of the first electrode layer and electrophoretic display layer provided within the gap is coated with a low surface energy coating layer to prevent the first electrode layer from sticking to the electrophoretic display layer. Accordingly, the electrophoretic display panel according to the embodiments of the invention may provide an excellent rewritable function.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Several embodiments are enumerated below to describe the invention, but the invention is not limited to the several embodiments that are enumerated. Also, an appropriate combination of the embodiments is permissible. The term "coupled to" used throughout the entire specification as filed (including the claims) may refer to any direct or indirect connecting means. For example, if the text describes a first apparatus as coupled to a second apparatus, the first apparatus may be interpreted as connected to the second apparatus directly, or connected to the second apparatus indirectly through other apparatuses or some kind of connecting means. Besides, the term "signal" may refer to at least one current, voltage, charge, temperature, data, electromagnetic wave or any other one or more signals.

Figure 1:
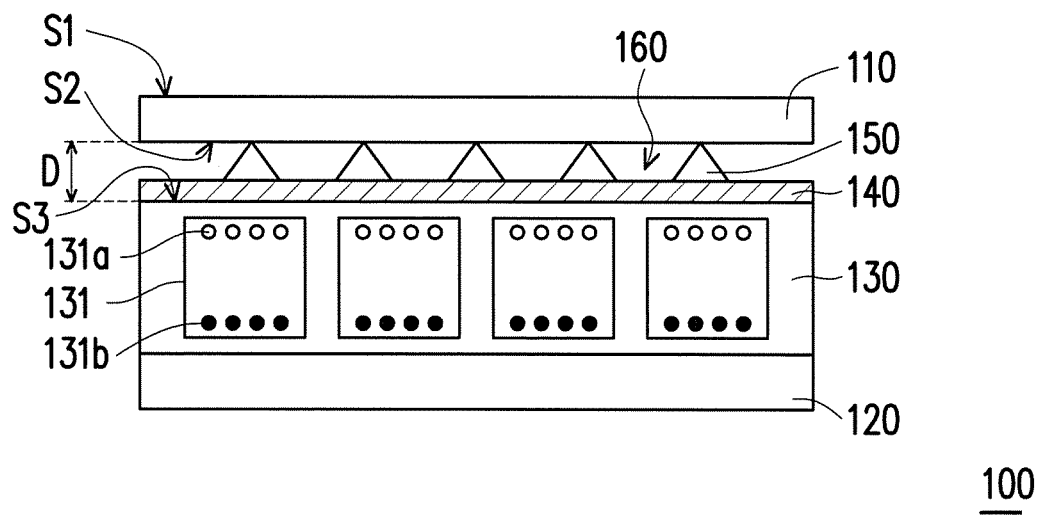
FIG. 1 is a structural schematic view of an electrophoretic display panel according to an embodiment of the invention.

FIG. 1 illustrates a structural schematic view of an electrophoretic display panel according to an embodiment of the invention. Referring to FIG. 1, an electrophoretic display panel 100 has a first electrode layer 110, a second electrode layer 120, an electrophoretic display layer 130, a low surface energy coating layer 140 and a plurality of spacers 150, and the electrophoretic display layer 130 is disposed between the first electrode layer 110 and the second electrode layer 120. In the embodiment, the electrophoretic display layer 130 is disposed on the second electrode layer 120, and the plurality of spacers 150 are disposed between the electrophoretic display layer 130 and the first electrode layer 110 to provide a gap 160 between the electrophoretic display layer 130 and the first electrode layer 110. In the embodiment, the first electrode layer 110 has a first surface S1 and a second surface S2, and the electrophoretic display layer 130 has a third surface S3. The low surface energy coating layer 140 is coated on the third surface S3 of the electrophoretic display layer 130. In the embodiment, the electrophoretic display layer 130 may have a plurality of electrophoretic units 131, and each of the electrophoretic units 131 may have colored particles 131a and 131b. The electrophoretic unit 131 may be of a microcup structure or a microcapsule structure.

In the embodiment, the first electrode layer 110 and the electrophoretic display layer 130 may be formed by a transparent conductive thin film and an electrophoretic display thin film supported in a plastic material (plyethylene terephthalate, for example). A material for the transparent conductive thin film may include indium tin oxide (ITO), indium zinc oxide (IZO), aluminium-doped zinc oxide (AZO) or graphene, etc. In the embodiment, the second electrode layer 120 may include a metal material whose entire surface is conductive, or may be a printed circuit board (PCB) substrate, a transparent conductive glass (ITO glass) or the like.

In the embodiment, the low surface energy coating layer 140 may be a transparent non-stick material of low surface energy coated on the third surface S3 to prevent the first electrode layer 110 from sticking to the electrophoretic display layer 130. A material for the low surface energy coating layer 140 may include a polymer containing fluorine such as polytetrafluoroethylene (PTFE). However, in an embodiment of the invention, the low surface energy coating layer 140 may be coated on the second surface S2. What's more, the second surface S2 as well as the third surface S3 may be coated with the low surface energy coating layer 140 to effectively prevent the second surface S2 from contacting the third surface S3 directly during a press operation.

Specifically speaking, the first electrode layer 110 is not disposed on the third surface S3 of the electrophoretic display layer 130 directly. The first electrode layer 110 is spaced apart from the electrophoretic display layer 130 by the gap 160 through the spacer 150. In the embodiment, each of the spacers 150 has the same length and an elastic insulation substance (a polymeric film, for example) is disposed between the second surface S2 of the first electrode layer 110 and the third surface S3 of the electrophoretic display layer 130 through even or specific arrangement. Consequently, in a state where no force is applied to the first electrode layer 110, a fixed gap distance D may be maintained between the first electrode layer 110 and the electrophoretic display layer 130. Moreover, in a state where force is applied to the first electrode layer 110, the gap distance D of the gap 160 between the first electrode layer 110 and the electrophoretic display layer 130 corresponding to a position where the force is applied may be compressed. That is, the gap distance D of the gap 160 may be changed flexibly with the press operation performed on the first surface S1 of the first electrode layer 110.

Figure 2:
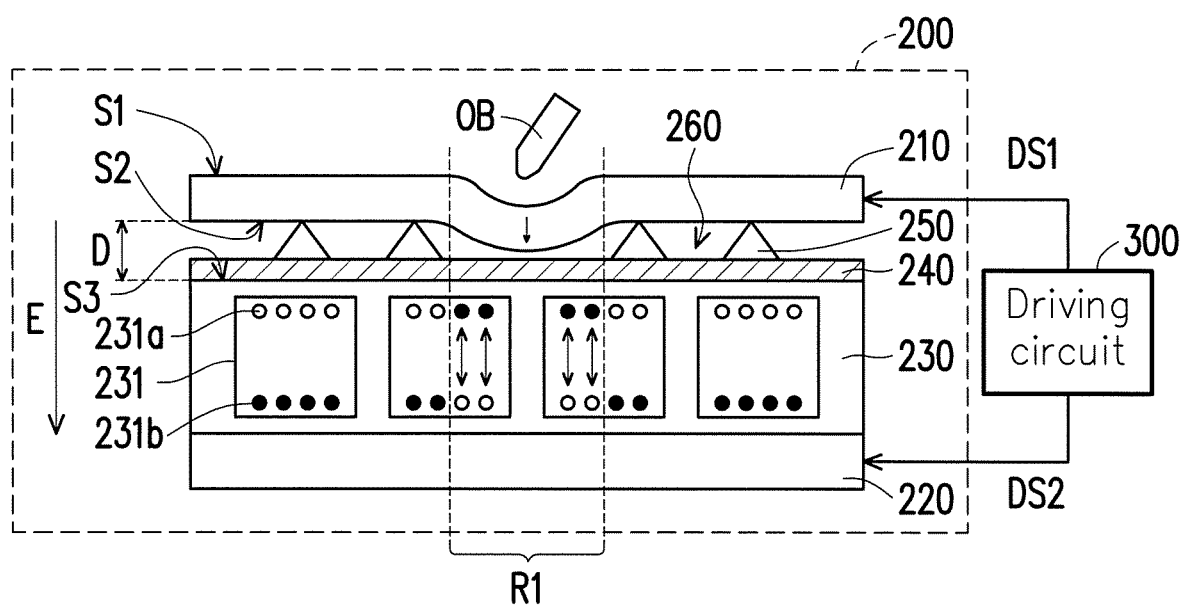
FIG. 2 is a schematic view of pressing of an electrophoretic display panel operated in a writing state according to an embodiment of the invention.

FIG. 2 illustrates a schematic view of pressing of an electrophoretic display panel in a writing state of an embodiment of the invention. Referring to FIG. 2, a first electrode layer 210 and a second electrode layer 220 of an electrophoretic display panel 200 may be coupled to a driving circuit 300. The driving circuit 300 is configured to provide a first driving signal DS1 to the first electrode layer 210 and provide a second driving signal DS2 to the second electrode layer 220 to generate an electric field E between the first electrode layer 210 and the second electrode layer 220. In the embodiment, a colored particle 231a may be a white particle with positive charges, while a colored particle 231b may be a black particle with negative charges.

Specifically speaking, the first driving signal DS1 provided by the driving circuit 300 is a ground voltage signal (such as 0 volt), and the second driving signal DS2 is a fixed direct current voltage signal (such as 12 volts), enabling the electrophoretic display panel 200 to be operated in the writing state. In case of no press operation, the electrophoretic display layer 230 is located in an even electric field environment, and an intensity of the electric field passing through the electrophoretic display panel 230 depends on a distance between the first electrode layer 210 and the second electrode layer 220. That is, the electric field E passing through the electrophoretic display panel 230 depends on the gap distance D of the movable gap 260.

It is noteworthy that in the embodiment, in a region where no press operation is performed, the electric field E passing through the electrophoretic display layer 230 does not drive the colored particles 231a and 231b to move. The first electrode layer 210 and the second electrode layer 220 may be spaced apart at a sufficient distance, so a distribution state of the colored particles 231a and 231b in the region where no press operation is performed are not affected by the electric field E. However, in the embodiment, in the region where the press operation is performed, since the gap distance D of the gap 260 decreases, a local electric field passing through the electrophoretic display layer 230 in a press region R1 increases as the distance between the first electrode layer 210 and the second electrode layer 220 decreases. In the embodiment, when the gap distance D is pressed to be reduced to within a specific distance, the colored particles 231a and 231b of the electrophoretic display layer 230 in the press region R1 may be moved by the increases of the local electric field. That is, when the electrophoretic display panel 200 is operated in the writing state, the distribution state of the colored particles 231a and 231b in the electrophoretic display layer 230 may be changed corresponding to the position where the force is applied. Therefore, the electrophoretic display panel 200 may have a writing function similar to that of the white board.

For example, when a press object OB such as a finger of a user or any pen-shaped device for press presses the first surface S1 of the first electrode layer 210, since the movable gap 260 is provided between the first electrode layer 210 and the electrophoretic display layer 230, the gap 260 corresponding to the press region R1 to which the press object OB applies force is compressed. That is, the local electric field passing through the electrophoretic display layer 230 in the press region R1 increases with the decrease in the gap distance D, so the black particle 231b of the electrophoretic display layer 230 in the press region R1 moves toward the third surface S3 of the electrophoretic display layer 230 and is stacked on one side of the electrophoretic unit 231. Moreover, the white particle 231a of the electrophoretic display layer 230 in the press region R1 moves away from the third surface S3 of the electrophoretic display layer 230 and is stacked on another side of the electrophoretic unit 231. Accordingly, the electrophoretic display panel 200 demonstrates a display result of white base and black pattern based on the press operation of the press object OB.

In addition, in the embodiment, when the electrophoretic display panel 200 is operated in the writing state, the first driving signal DS1 may be 0 volt. A voltage magnitude of the second driving signal DS2 may depend on the particle characteristics of the colored particles 231a and 231b and the distance between the first electrode layer 210 and the second electrode layer 220. The invention is not limited thereto.

Figure 3:
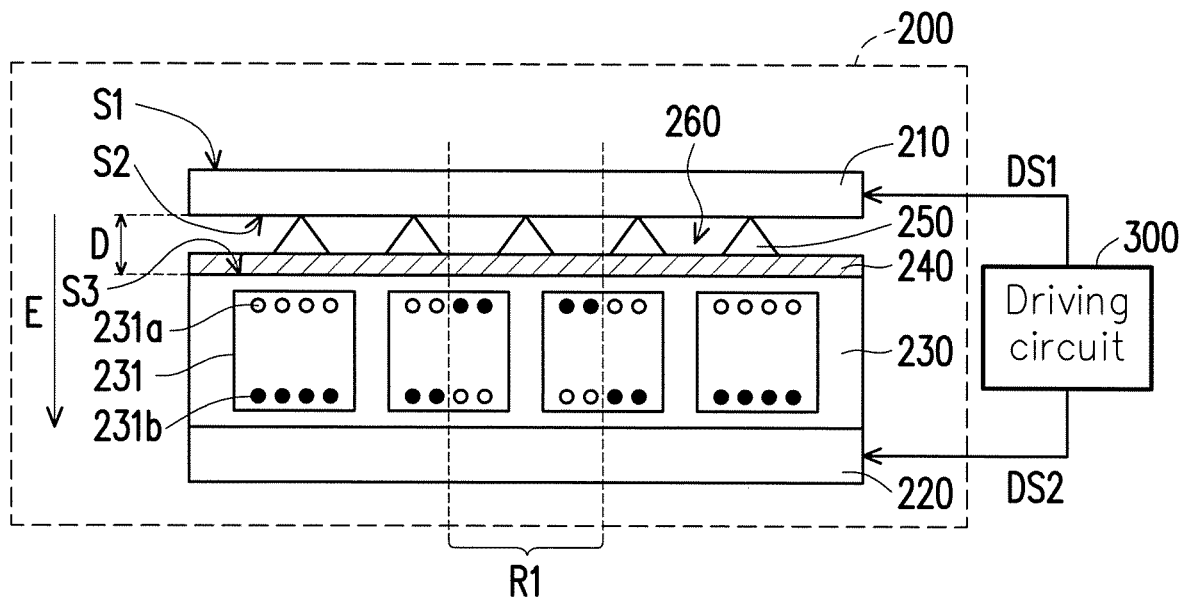
FIG. 3 is a schematic view of display of an electrophoretic display panel operated in a writing state according to an embodiment of the invention.

FIG. 3 illustrates a schematic view of display of an electrophoretic display panel in a writing state of an embodiment of the invention. Referring to FIG. 3, in the embodiment, when the applied force of the press operation disappears, the gap distance D between the first electrode layer 210 and the electrophoretic display layer 230 in the press region R1 is restored to an original size since a plurality of spacers 250 are disposed between the first electrode layer 210 and the electrophoretic display layer 230. Moreover, in the embodiment, the colored particles 231a and 231b in the electrophoretic display layer 230 subject to the press operation maintain the distribution state of the colored particles as illustrated in FIG. 3. That is, the content written by the press object is maintained.

It is noteworthy that after repeated press operations are performed on the electrophoretic display panel 200, the second surface S2 of the first electrode layer 210 may stick to the third surface S3 of the electrophoretic display layer 230, thus leading to generate thin film interference of Newton's Ring when no force is applied to the second surface S2 of the first electrode layer 210 and the third surface S3 of the electrophoretic display layer 230. Moreover, the writing function of the electrophoretic display panel 200 may be affected and the electrophoretic display layer 230 is unable to demonstrate a display difference between the press region and the non-press region accurately. Consequently, in order to prevent such a situation, in the embodiment, at least one of the second surface S2 and the third surface S3 may be coated with a low surface energy material to effectively prevent the second surface S2 from sticking to the third surface S3.

Figure 4:
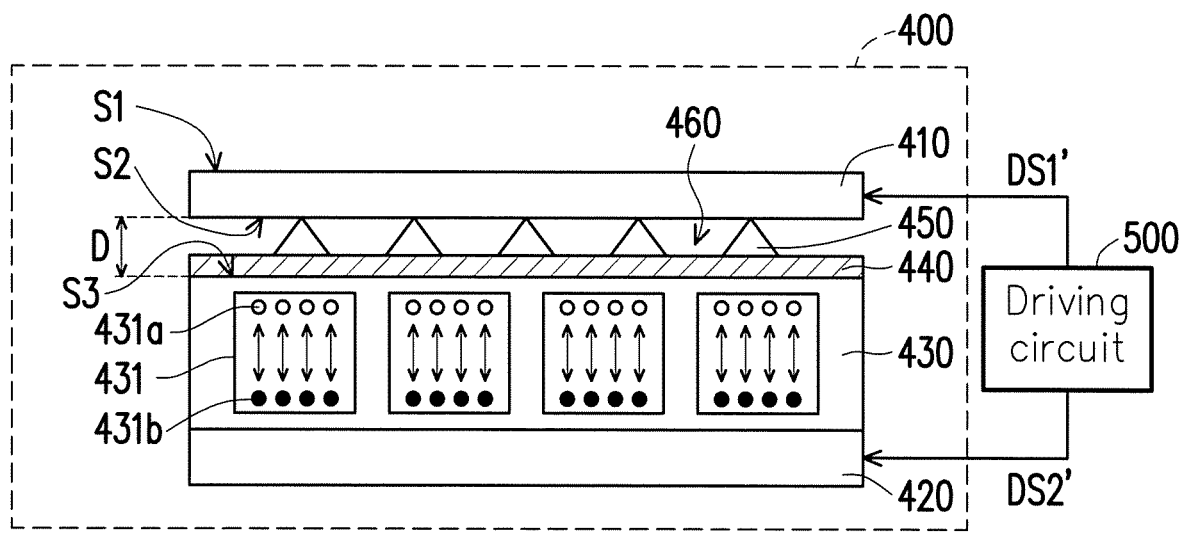
FIG. 4 is a schematic view of an electrophoretic display panel operated in a refresh state according to an embodiment of the invention.
Figure 5:
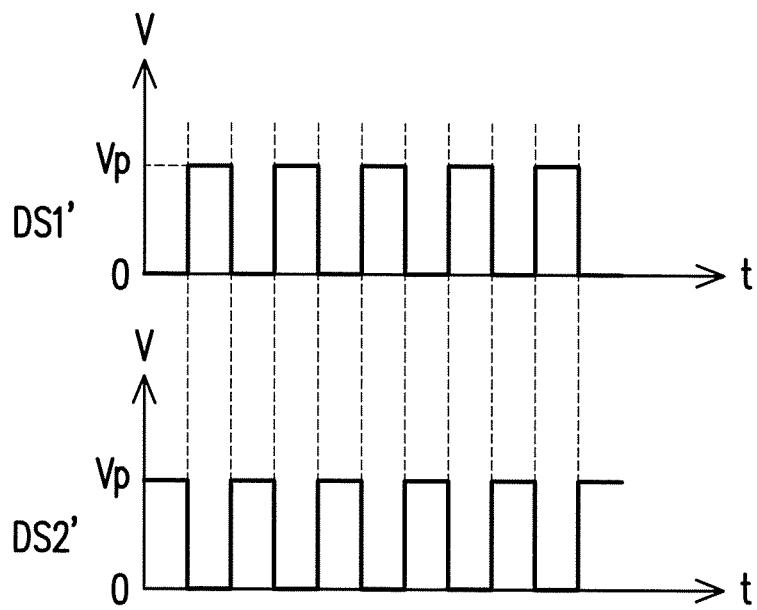
FIG. 5 is a signal waveform of a first driving signal and a second driving signal according to an embodiment of the invention.

FIG. 4 illustrate a schematic view of an electrophoretic display panel operated in a refresh state of an embodiment of the invention. FIG. 5 illustrates a signal waveform of the first driving signal and the second driving signal of the embodiment in FIG. 4. Referring to FIGS. 4 and 5, a driving circuit 500 provides two square-waveform pulse voltages as a first driving signal DS1' and a second driving signal DS2' to enable an electrophoretic display panel 400 to be operated in a refresh state. In the embodiment, the first driving signal DS1' provided by the driving circuit 500 may serve as a first pulse voltage, and the second driving signal DS2' may serve as a second pulse voltage. A phase of the first pulse voltage is opposite to a phase of the second pulse voltage. In the embodiment, when the distribution states of colored particles 431a and 431b of each electrophoretic unit 431 in an electrophoretic display layer 430 are inconsistent, the driving circuit 500 may provide two square-waveform pulse voltages in opposite phases to a first electrode layer 410 and a second electrode layer 420, so as to change the distribution state of the colored particles in the electrophoretic display layer 430 by providing a strong electric field repeatedly. In the embodiment, a peak voltage Vp (such as 60 volts) provided by the driving circuit 500 to the first pulse voltage and the second pulse voltage in the refresh state is larger than a fixed voltage (such as 12 volts) provided by the driving circuit 500 in the writing state, so the electric field generated between the first electrode layer 410 and the second electrode layer 420 may forcefully drive the colored particles 431a and 431b to move when the electrophoretic display panel 400 is not pressed.

For example, when the first pulse voltage provided by the driving circuit 500 to the first electrode layer 410 during a time period is a ground voltage signal (such as 0 volt), the second electrode layer 420 correspondingly receives a direct current voltage signal having a peak voltage of 60 volts. Consequently, during the time interval, the black particle 431a with negative charges in the electrophoretic display layer 430 moves toward the third surface S3 of the electrophoretic display layer 430 and is stacked on one side of the electrophoretic unit 431. Moreover, the white particle 431b with positive charges in the electrophoretic display layer 430 moves away from the third surface S3 of the electrophoretic display layer 430 and is stacked on another side of the electrophoretic unit 431.

Next, when the first pulse voltage provided by the driving circuit 500 to the first electrode layer 410 during another time period is a direct current voltage signal having the peak voltage of 60 volts, the second electrode layer 420 correspondingly receives a ground voltage signal (such as 0 volt). Consequently, in the another time interval, the white particle 431a with positive charges in the electrophoretic display layer 430 moves toward the third surface S3 of the electrophoretic display layer 430 and is stacked on one side of the electrophoretic unit 431. Moreover, the black particle 431b with negative charges in the electrophoretic display layer 430 moves away from the third surface S3 of the electrophoretic display layer 430 and is stacked on another side of the electrophoretic unit 431. Finally, the driving circuit 500 may arrange all the white particles 431a on one side of the third surface S3 of the electrophoretic display layer 430 and arrange all the black particles 431b on another side.

That is, the driving circuit 500 may provide a high peak voltage Vp and two pulse voltages whose phases are opposite to each other, enabling the electrophoretic display layer 430 of the electrophoretic display panel 400 to refresh the distribution state of the colored particles 431a and 431b repeatedly. Consequently, in the embodiment, after the writing state of the electrophoretic display panel 400 ends, the electrophoretic display panel 400 may refresh the distribution state of the colored particles in the electrophoretic display layer 430 through the refresh state to make the electrophoretic display panel 400 rewritable. Moreover, in the embodiment, the peak voltage Vp of the pulse voltage may depend on a user's demand or the particle characteristics of the electrophoretic display layer. The invention is not limited thereto.

In the embodiment, pulse widths of the pulse voltages of the first driving signal DS1' and the second driving signal DS2' depend on the particle characteristics of the colored particles 431a and 431b and the distance between the first electrode layer 410 and the second electrode layer 420. The invention is not limited thereto. Moreover, the pulse numbers of the pulse voltages of the first driving signal DS1' and the second driving signal DS2' may depend on the particle characteristics of the colored particles 431a and 431b and a degree to which the electrophoretic display layer 430 is cleaned. The invention is not limited thereto, either.

In addition, regarding the material characteristics and arrangement relationship of the first electrode layer 410, the second electrode layer 420, the electrophoretic display layer 430, a low surface energy thin film 440 and a plurality of spacers 450 in FIG. 4, the embodiments in FIGS. 1-3 already provide sufficient teachings, suggestions and exemplary descriptions, so no redundant descriptions are repeated.

Figure 6:
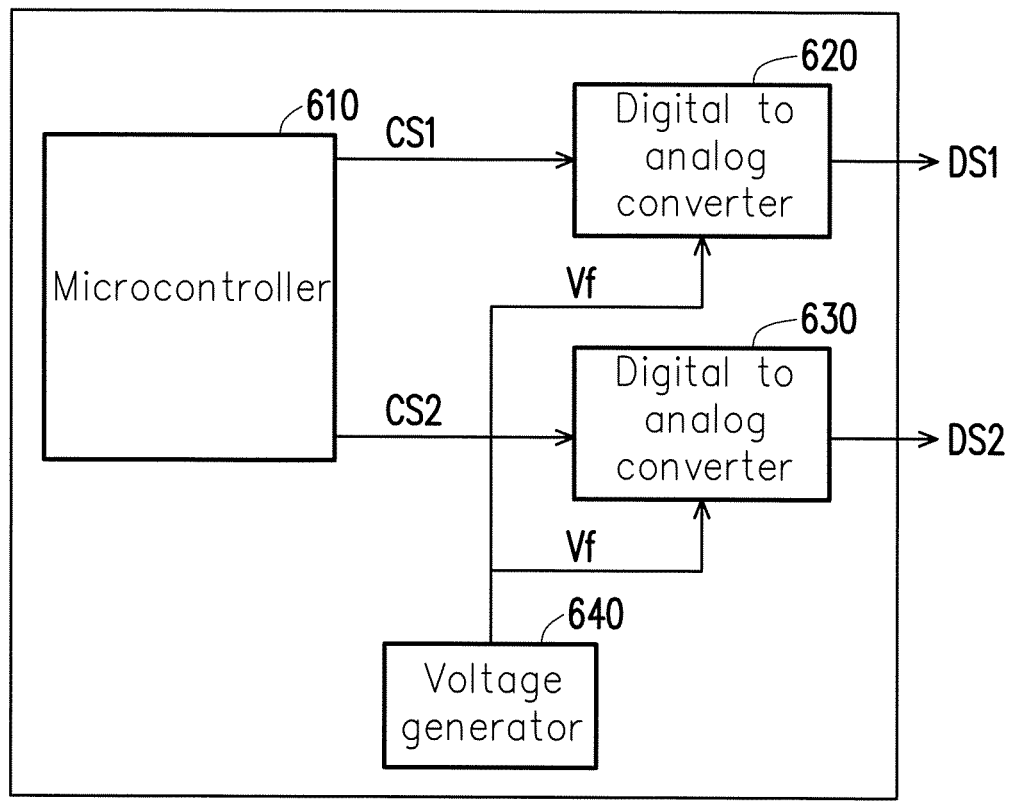
FIG. 6 is a block schematic view of driving circuit according to an embodiment of the invention.

FIG. 6 illustrates a block schematic view of driving circuit of an embodiment of the invention. Referring to FIG. 6, a driving circuit 600 includes a microcontroller 610, a first digital-to-analog converter 620, a second digital-to-analog converter 630 and a voltage generator 640. In the embodiment, the driving circuit 600 may be configured to be coupled to and drive the electrophoretic display panel as illustrated in the embodiments of FIGS. 1-4. In the embodiment, the microcontroller 610 is coupled to the first digital-to-analog converter 620 and the second digital-to-analog converter 630. The microcontroller 610 respectively outputs a first control signal CS1 and a second control signal CS2 to the first digital-to-analog converter 620 and the second digital-to-analog converter 630 based on the operation state of the electrophoretic display panel. The voltage generator 640 provides a voltage level Vf as required by the first digital-to-analog converter 620 and the second digital-to-analog converter 630, enabling the first digital-to-analog converter 620 and the second digital-to-analog converter 630 to generate the first driving signal DS1 and the second driving signal DS2 corresponding to the operation state of the electrophoretic display panel. In the embodiment, the first digital-to-analog converter 620 and the second digital-to-analog converter 630 may be a high voltage digital-to-analog converter (High Voltage DAC). Specifically speaking, a user may choose to execute the operation state of writing or refreshing of the electrophoretic display panel, so the driving circuit 600 determines a driving signal as required to operate the electrophoretic display panel in the writing or refresh state based on the result of the user's choice.

For example, when the electrophoretic display panel is operated in the writing state as illustrated in FIGS. 2-3, the driving circuit 600 may provide the first driving signal DS 1 of the ground voltage (such as o volt) to the first electrode layer and provide the second driving signal DS2 having a fixed voltage (such as 12 volts) to the second electrode layer. However, when the electrophoretic display panel is operated in the refresh state as illustrated in FIG. 4, the driving circuit 600 may provide the high peak voltage Vp (such as 60 volts) and two pulse voltages in opposite phases to the first electrode layer and the second electrode layer to refresh the distribution state of the colored particles in the electrophoretic display layer repeatedly.

In view of the foregoing, in the exemplary embodiments of the invention, the electrophoretic display panel may be operated in the writing state and the refresh state through the driving signals provided by the driving circuit to the first electrode layer and the second electrode layer. That is, the electrophoretic display panel may change the distribution state of the colored particles in the electrophoretic display layer based on the press operation of the user to display contents, such as words or images, and repeatedly refresh the distribution state of the colored particles in the electrophoretic display layer through a strong electric field to remove the content written through the press operation. Moreover, in the exemplary embodiment of the invention, one of the surfaces between the first electrode layer and the electrophoretic display layer at the gap may be coated with the low surface energy coating layer to prevent the first electrode layer from sticking to the electrophoretic display layer after the repeated press operations. As such, the rewriting quality and life time of the electrophoretic display panel are effectively maintained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electrophoretic display panel, comprising:
    a first electrode layer having a first surface and a second surface corresponding to the first surface, wherein the second surface of the first electrode layer has a first low surface energy coating layer;
    a second electrode layer; and
    an electrophoretic display layer having a third surface, disposed between the first electrode layer and the second electrode layer, wherein the third surface of the electrophoretic display layer has a second low surface energy coating layer, wherein the first low surface energy coating layer and the second low surface energy coating layer are disposed between the first electrode layer and the electrophoretic display layer, wherein a gap is provided between the third surface of the electrophoretic display layer and the second surface of the first electrode layer so as to keep the first low surface energy coating layer spacing apart from the second low surface energy coating layer, and wherein a gap distance of the gap is changed with a press operation.

2. The electrophoretic display panel of claim 1, further comprising:

a plurality of spacers, disposed between the second surface and the third surface, and configured to separate the first electrode layer from the electrophoretic display layer to form the gap.

3. The electrophoretic display panel of claim 1, wherein the press operation is performed by applying a force to the first surface of the first electrode layer, such that the gap distance corresponding to a press region is changed with the press operation.

4. The electrophoretic display panel of claim 3, wherein the first electrode layer and the second electrode layer respectively receive two different voltage signals, such that an electric field is provided between the first electrode layer and the second electrode layer, wherein the electric field passing through the electrophoretic display layer is changed with the gap distance, such that a distribution state of colored particles in the electrophoretic display layer is changed with the press operation.

5. The electrophoretic display panel of claim 4, wherein the electric field passing through the electrophoretic display layer in the press region increases with the decrease in the gap distance.

6. The electrophoretic display panel of claim 1, wherein the first electrode layer and the second electrode layer are coupled to a driving circuit, the driving circuit is configured to provide a first driving signal to the first electrode layer, and provide a second driving signal to the second electrode layer, such that an electric field is generated between the first electrode layer and the second electrode layer.

7. The electrophoretic display panel of claim 6, wherein when the first driving signal is a ground voltage, and the second driving signal is a fixed voltage, the electrophoretic display layer is operated in a writing state.

8. The electrophoretic display panel of claim 7, wherein when the first driving signal is a first pulse voltage, the second driving signal is a second pulse voltage, and a phase of the first pulse voltage is opposite to a phase of the second pulse voltage, the electrophoretic display layer is operated in a refresh state.

9. The electrophoretic display panel of claim 8, wherein a peak voltage of the first pulse voltage or the second pulse voltage is larger than the fixed voltage.

10. The electrophoretic display panel of claim 6, wherein the driving circuit comprising:

a microcontroller, configured to output a first control signal and a second control signal; and a first digital-to-analog converter and a second digital-to-analog converter, coupled to the microcontroller, wherein the first digital-to-analog converter and the second digital-to-analog converter respectively generate the first driving signal and the second driving signal based on the first control signal and the second control signal.

11. The electrophoretic display panel of claim 10, wherein the driving circuit further comprising:

a voltage generator, coupled to the first digital-to-analog converter and the second digital-to-analog converter, and configured to provide a voltage level to the first digital-to-analog converter and the second digital-to-analog converter.

* * * * *